Patented Sept. 12, 1933

1,926,303

UNITED STATES PATENT OFFICE 1,926,303

PROCESS FOR MAKING FLOOR-COVERINGS

Heinrich Paulus, Nuremberg, Germany

No Drawing. Application May 18, 1931, Serial No. 538,267, and in Czechoslovakia March 12, 1931

3 Claims. (Cl. 18—48)

This invention relates to coverings for floors, walls and other surfaces and to a new and improved process for producing the same.

Applicant is aware that floor coverings have been made consisting entirely of rubber, or of compressed cork granules, with or without an admixture of caoutchouc and vulcanizing agents, but so far as applicant is aware these have been unsatisfactory in use. Floor coverings of this kind have been very rigid and unable to adhere to any irregularities in the supporting surface and soon form waves in their surface, crack and become loosened. Furthermore, coverings of this kind are affected by the ageing of the rubber and gradually show fissures and fractures.

Floor coverings made of compressed cork granules which contain no binder or a binder other than rubber are neither sufficiently elastic and pliable nor durable enough and do not permit the admixture of colorings to obtain uniform tints. Again, experiments to produce high grade floor coverings by mixing cork granules with a liquid binder as for instance caoutchouc solution have failed also when reinforcements were inserted. The same must be said of floor coverings consisting of fibrous materials and oil caoutchouc.

It is a primary object of this invention to produce a covering which is readily adapted to be securely fastened to almost any kind of supporting surface by the use of ordinary adhesive or cement.

A further object is the provision of such a covering that needs no cushioning or reinforcing strips of fabric or the like interposed between it and the supporting surface.

Another object is the provision of such a covering that is durable in use and rigid but with sufficient elasticity to conform to the supporting surface.

The present invention consists in a process for making an extremely meritorious floor covering by mixing cork granules with raw, dry rubber and sulphur in such quantities, that the quantity of cork forms 50 to 85 per cent by weight of the whole mass and sulphur 15 to 35 per cent of the weight of the rubber. The whole mass so proportioned and brought into desired form is then hot vulcanized under high pressure preferably from 30 to 60 kg. per square cm. (425 to 850 lbs. per square inch) and the vulcanized product is finally permitted to cool under pressure.

The invention is based on the observation obtained by continued experiments that the suberin contained in the cork when vulcanized together with rubber not only very effectively prevents the ageing of the rubber, but also an overvulcanization thereof. This effect is also obtained in the presence of comparatively large quantities of sulphur.

A mixture of cork granules, rubber and sulphur in the above given proportions when vulcanized under high pressure furnishes therefore a product which combines in itself the desirable qualities inherent in the cork with those of the rubber. The inherent deficiencies of these substances are thereby made ineffective.

The above described process furthermore permits of the simultaneous incorporation of colorings or color pigments as well as the applications of vulcanization accelerators. These additions do not impair the qualities of the product in the least and despite the high sulphur content these coverings do not become too hard or too brittle. Moreover they remain extremely resilient and have proved to resist water, acids, alkalis, organic solvents and mechanical wear with highest efficiency and durability.

In practicing the novel process for making the improved flooring, a quantity of unvulcanized rubber is mixed, in a roller or kneading mill, with thirty (30) per cent of sulphur and one (1) per cent of a suitable vulcanization accelerator. With 20 kilogrammes (44 lbs.) of this rubber mass, a quantity of 100 kilogrammes (220 lbs.) of granulated cork is then intermixed simultaneously preventing a crushing of the cork granules. This dry aggregate is then rolled out and flattened on a rolling mill into plate formation of 10 millimeter thickness and compressed in a vulcanizing press under pressure of 50 kilogrammes per square centimeter (710 lbs. per square inch) to 4 millimeters thickness then vulcanized for one hour under a steam pressure of 60 pounds (temperature 293 degrees F.—145 degrees C.) and then cooled under maintenance of the compression. After a few days storing the product may be suitably finished by grinding, polishing or the like.

It has been mentioned hereinbefore that the uniform and effective coloring of pressed cork plates without admixture of rubber and vulcanizing agents was connected with great difficulties. By the present invention these difficulties have been completely overcome and it is possible without special precautions to successfully intermix pigments with rubber and cork granules so that the product may be colored to any desired color tint and shade. Besides pigments or in their place other fillers may be mixed into the cork and rubber mass before vulcanization.

To produce a colored flooring the following process is followed:

A quantity of finely granulated cork is colored, with any desired color, for a period of forty-eight (48) hours in a cold bath consisting of an alcoholic solvent and a coloring medium which is capable of withstanding vulcanization without change of color. After this the colored cork is thoroughly dried. A quantity of rubber compound or caoutchouc is colored with the same color so as to withstand vulcanization and to this rubber compound is added approximately thirty (30) per cent of sulphur and one (1) per cent of a vulcanizing material. This mixture of rubber, sulphur and vulcanizing material is kneaded between calender rollers. Into a quantity of two (2) kg. of this kneaded rubber mixture is placed ten (10) kg. of the above named colored cork and the two mixtures are kneaded between spaced rollers so as not to injure the cork particles. This resultant mixture is then passed between calender rollers which press it into plate formation. This plate formation thus produced is placed upon the table of a vulcanizing press and compressed to a thickness of approximately 4 mm. It is next vulcanized under pressure of 60 lbs. for one hour and cooled under pressure for 10 minutes whereupon it is removed from the press. The raw plates thus produced are permitted to age for a period of from 10 to 14 days. After this ageing process the plates are passed between cylinders covered with sand paper and ground flat and then are passed between cylinders covered with felt with powdered pumice thereon which results in giving the product a highly glossed and attractive appearance.

Coverings of this kind may of course be made of any desired thickness and laid upon any kind of wood, cement or composition floor surface without interposing a layer of fabric. They may be tightly fastened hereto by suitable adhesives or cements. Furthermore, this floor covering requires no reinforcements like layers of threads, cords, fabrics, etc. because it is entirely self-supporting.

I claim:

1. The method of producing floor coverings which consists in mixing together dry raw rubber with not less than 15 per cent by weight of sulphur and with 50 per cent to 85 per cent of the whole mass of cork granules by kneading and rolling giving the whole mass a desired shape and then vulcanizing said mass under a pressure of from 425 to 850 pounds per square inch and a temperature of approximately 145° C. and finally cooling it while the pressure is sustained.

2. The method of producing floor coverings which consists in mixing together in dry state a quantity of raw rubber with not less than fifteen percent of its weight of sulphur and adding to this mixture more than an equal weight of granulated cork while kneading the mixture and bringing the whole mass into desired shape by rolling it and then vulcanizing the mass between plates under a pressure of from 425 to 850 pounds per square inch, and a temperature of approximately 145° C. and by finally cooling it while under pressure.

3. The method of producing floor covering which consists in coloring a quantity of cork granules by their insertion in a cold bath consisting of an alcoholic solvent containing a coloring medium, and which is capable of penetrating the cork granular and of withstanding vulcanization, the colored cork granules being then permitted to thoroughly dry; next a quantity of rubber compound or caoutchouc is colored to the same color, a quantity of sulphur and vulcanizing material is mixed with the rubber compound; the mixture of rubber, sulphur and vulcanizing material is then kneaded together and into a quantity of this kneaded material is next added a quantity of the aforesaid colored cork granules and the kneaded material and cork granules are further kneaded together by rollers and the resultant product passed between calender rollers pressing it into plate formation which is then compressed to the desired thickness and vulcanized between plates under a pressure of from 425 to 850 pounds per square inch, and then cooled under pressure.

HEINRICH PAULUS.